UNITED STATES PATENT OFFICE.

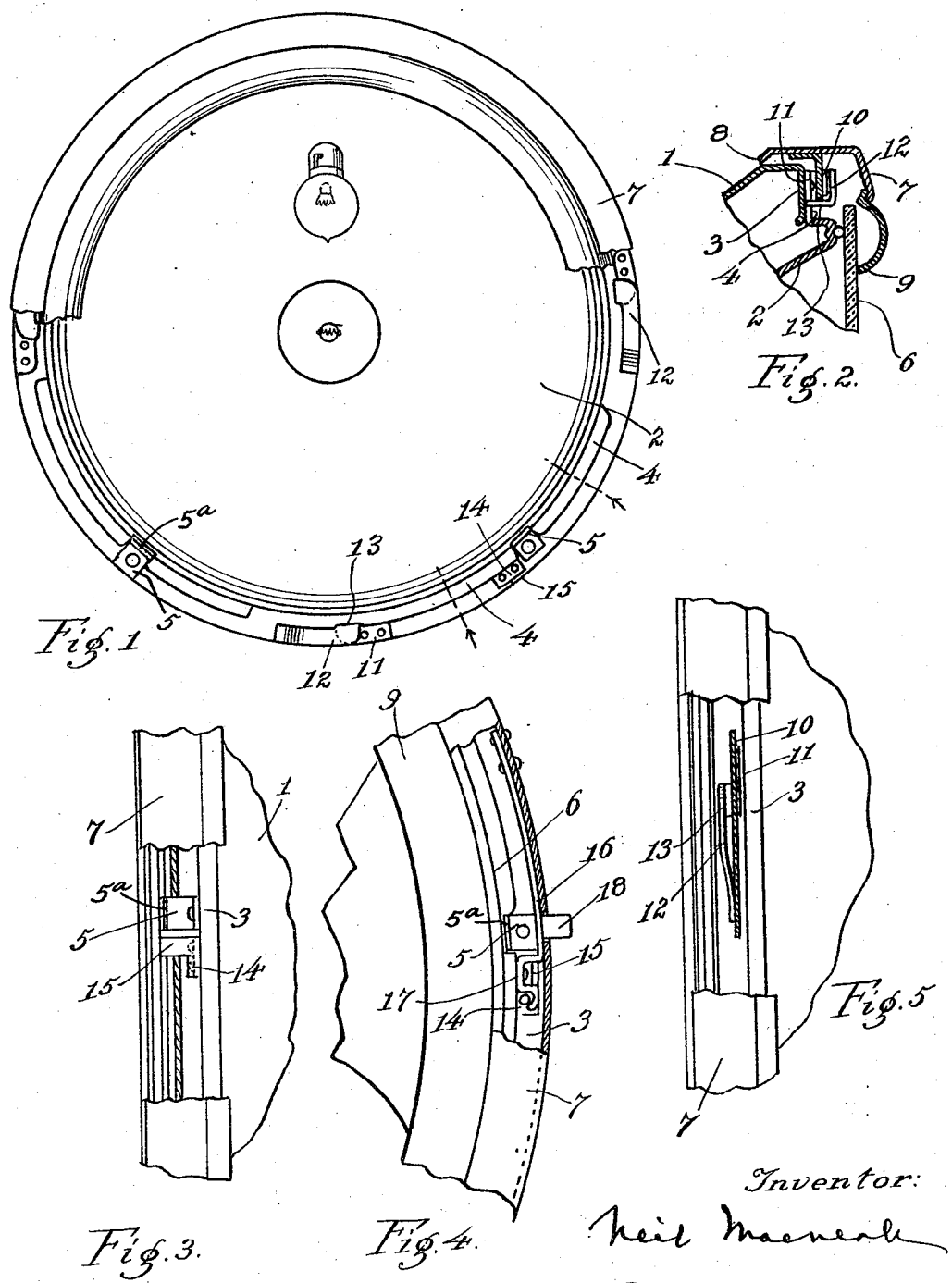

NEIL MACNEALE, OF CINCINNATI, OHIO, ASSIGNOR TO THE CORCORAN-VICTOR COMPANY, OF CINCINNATI, OHIO, A CORPORATION OF OHIO.

LAMP.

1,414,518.　　　　Specification of Letters Patent.　　Patented May 2, 1922.

Application filed June 19, 1919. Serial No. 305,242.

*To all whom it may concern:*

Be it known that I, NEIL MACNEALE, a citizen of the United States, and a resident of Cincinnati, in the county of Hamilton and State of Ohio, have invented certain new and useful Improvements in Lamps, of which the following is a full, clear, and exact description, reference being had to the accompanying drawings, forming part of this specification.

My invention relates to vehicle lamps of the type wherein the lamp has a removable glass engaging ring or rim that fits and is held over the lamp body by means of tongues or pins engaging therein.

In lamps of this type, the devices employed have universally, so far as I am advised, required that the operator press inwardly against the rim while twisting it to bring the tongues into engagement with the shoulders provided on the lamp body, thereby pressing inwardly on a spring-pressed reflector, or else the tongues themselves being in the form of leaf springs. This operation was a difficult one, and resulted, very often, in the operator insufficiently closing his lamp, so that the rim and glass would fall off and become broken.

It is thus the object of my invention to provide a lamp structure in which the engaging members for the rim so act as to convert the twisting motion imparted to the rim, in mounting it, into an inward motion also, thereby automatically bringing the rim to a proper clamping fit over the lamp body and lens. It is also an object to provide for a simple locking catch, which will not only indicate to the operator the point to which it is necessary to revolve or twist the rim, but will also positively lock it against removal.

These objects and other advantages to be noted I accomplish by that certain construction and arrangement of parts to be hereinafter more specifically pointed out and claimed.

In the drawings,

Figure 1 is a plan view of the front of a lamp, with the rim broken away to illustrate my invention.

Figure 2 is a detail cross section taken so as to show the operation of the retaining devices.

Figure 3 is a detail side elevation taken with the lamp rim broken away to show the latch.

Figure 4 is a detail plan view showing the latch in operation, with the rim again partly broken away.

Figure 5 is a detail side elevation, showing the operation of the retaining devices, the rim being again partly broken away.

The lamp body is shown at 1, within which rests the reflector 2. On the flange 3 of the lamp body rest the flanges 4 of the reflector. I prefer that the flanges 4 be arranged with spaces left between them, to provide clearance for the clips 5, which have ribbed tongues 5ª to retain the glass or lens 6 of the lamp. As so far described, the lamp possesses no features of difference over lamps of familiar use in the art, the clips being those normally used in such structures.

The rim 7 of the lamp is shaped to wipe the lamp body at 8 and to bear against the glass at 9 (Figure 2). It has also a plurality of interspaced tongues 10, which form part of the rim retaining devices.

On the flange of the lamp body are mounted the tongue engaging members, which have bases 11 secured to said flange, and terminating in raised portions 13 and retaining tongues 12. These tongues are set to match the position of the tongues on the rim, and are elevated at their receiving ends above the bases, so as to form inwardly sloping walls. Preferably the tongues are unitary with the bases and begin at the upper edge of the raised portion 13.

When the rim is placed over the lamp body, the ends of the tongues 10 will easily ride under the elevated ends of the tongues 12, and upon twisting the rim the tongues thereon will ride down or inwardly of the lamp, thereby bringing it tightly down against the body. Such resiliency as lies in the tongues will make the clamping fit more or less resilient, and the rim will retain the glass or lens firmly in place against the reflector.

Mounted adjacent to one of the glass retaining clips is a plate having a base 14, and an upwardly extending member 15. The member 15 serves as a shoulder to be engaged by a spring latch 16 which is secured to the side of the rim member, intermediate two of the tongues, and has a hooked end 17. A small plunger 18 is slidably mounted in the side of the lamp rim and secured at its inner end to the latch, so that by depressing the plunger the latch will be raised (Figure 4).

When the operator has placed the rim on the lamp and turned or twisted it, the spring latch will engage over the shoulder member 15, thereby retaining the rim against turning off until the plunger has been depressed.

It is apparent that little or no inward pressure need be applied in the operation of mounting the rim on the lamp, since the retaining tongues serve to automatically bring the rim down firmly against the lamp body due to their conformation above referred to. The operator with proper instruction will always turn the rim until the latch comes into engagement, and thus will never insufficiently mount the rim. The rim will thus always be tight and non-rattling and the lock will hold it against chance jarring off.

Having thus described my invention, what I claim as new and desire to secure by Letters Patent, is:—

1. In a lamp, the combination with a flanged lamp body and a rim, of tongues on the rim and body to engage each other upon twisting of the rim, the body tongues mounted on the flange and extending outwardly from the same, said tongues having a conformation to bring the rim firmly down upon the body upon said twisting engagement, and said tongues being positioned to extend in and engage on a line radial to the axis of the lamp and outwardly from the flange of the lamp body, for the purpose described.

2. The combination with a flanged lamp body, said body having mounting elements for a rim secured to the flange and having a wall in the lamp body, extending outward axially thereof, said wall thence extending out radially of the body, and turning at an angle and extending in a direction circumferential of the lamp body, said last noted extension having a slanting face inclined inwardly of the body, and a rim, said rim having a projection extending inwardly and radially to engage said mounting element.

3. The combination with a flange lamp body, said body having mounting elements for a rim secured to the flange and having a wall in the lamp body, extending outward axially thereof, said wall thence extending out radially of the body, and turning at an angle and extending in a direction circumferential of the lamp body, said last noted extension having a slanting face inclined inwardly of the body, and a rim, said rim having a projection to engage said mounting element, said projection comprising a tongue extending inwardly and radially of the rim.

4. In a lamp, the combination with a lamp body and a rim, of tongues on the rim and body to engage each other upon the twisting of the rim, said tongues having a conformation to bring the rim firmly down upon the body upon said twisting engagement, and said tongues being positioned to extend in and engage on a line radial to the axis of the lamp, said body tongues comprising raised supports on the body and portions extending toward the body from said supports, the ends of the tongues being free and resilient.

NEIL MACNEALE.